Patented Sept. 12, 1933

1,926,829

UNITED STATES PATENT OFFICE 1,926,829

PURIFICATION OF SULPHUR

Fritz Winkler and Fritz Giller, Ludwigshafen-on-the-Rhine, and Hans Dorsch, Leuna, Germany assignors to I. G. Farbenindustrie Aktiengesellschaft, Frankfort-on-the-Main, Germany No Drawing. Application December 13, 1932. Serial No. 646,974, and in Great Britain August 24, 1931

8 Claims. (Cl. 23—228)

The present invention relates to the purification of sulphur.

When purifying illuminating gas, coke oven gases and low temperature carbonization gases from sulphur by means of solid gas purifying masses, as for example masses containing iron oxide, or active carbon, a sulphur having a blackish colour and an unpleasant odor which is strongly contaminated with organic substances is obtained therefrom by extraction with organic solvents, as for example carbon disulphide, and evaporation of the same.

It has already been proposed to purify such impure sulphur contaminated with organic substances, for example sulphur which has been obtained as hereinbefore described in the form of its solution in organic solvents, such as carbon disulphide with fuming sulphuric acid. This process, however, is attended with several disadvantages which render it difficult to use the said process in practice on an industrial scale. These difficulties are that the temperature is liable to rise during the treatment, whereby by-reactions giving rise to losses, as for example the interaction of the sulphur trioxide present on the carbon disulphide, and even explosions may occur.

We have found that a pure, yellow and practically or completely odorless product is obtained in a simple manner from contaminated solutions of sulphur of the said kind by thoroughly intermixing them with fuming sulphuric acid, while taking care that no substantial increase of the temperature takes place, so that a temperature between about 15° and about 30° C. is maintained practically throughout. The deposited impurities are separated together with the acid and the solvent is removed, for example by distillation.

The aforesaid condition may be maintained for example by intimately stirring the solution of the crude sulphur in, for example, carbon disulphide, with an addition of only small amounts of fuming sulphuric acid by means of a rapidly moving stirrer, whereby thorough intermixing takes place. The amount of fuming sulphuric acid calculated with reference to the solution should not exceed 1.5 per cent by volume and should preferably be only 1 per cent by volume or even less. In this way the aforesaid disadvantages are avoided even if during the treatment water should be introduced unintentionally. The said treatment has the further advantage that only small amounts of oxidation products of carbon disulphide are obtained.

Another way of maintaining the aforesaid condition, and one which is often a more preferable one comprises treating the anhydrous solution of the sulphur in a suitable solvent, such as carbon disulphide, by introducing it into a comparatively large quantity of fuming sulphuric acid by portions or batches, while stirring and excluding water, thereby maintaining ordinary or only slightly elevated temperatures, each batch of the treated solution being removed from the fuming sulphuric acid before adding another batch of the crude solution.

This latter method of working may be carried out, for example, as follows: The sulphur to be purified is dissolved in carbon disulphide and the impure solution is freed from any water which may be present therein from the dissolution of the sulphur, for example from the extraction of spent gas purifying mass and which remains in an emulsified state probably due to the tarry constituents present. The said removal of water may be effected by allowing the solution to stand and then withdrawing the separated aqueous layer. The removing of water is essential because the presence of water would require a higher consumption of fuming sulphuric acid due to conversion of sulphur trioxide into sulphuric acid and because it would cause an increase in the temperature by the aforesaid reaction so that in view of the low boiling point of carbon disulphide substantial increases in pressure may occur which may lead to the hereinbefore mentioned explosions. The anhydrous solution is then brought together with a larger amount of oleum than would be necessary for the purification and is stirred therewith preferably until the temperature remains constant. The fuming sulphuric acid with the tarry constituents is then allowed to settle and the sulphur solution is removed. A further amount of the fresh solution is then added to the oleum in the vessel, and this is repeated as long as the quality of the purified sulphur meets the requirements which is usually the case until the free sulphur trioxide present has been used up. The amount of fuming sulphuric acid is preferably selected so that about 5 or more batches of crude solution may be purified in the said manner. It is a particular advantage of this method of working that it is easy to obtain a thorough distribution and intermixture of the fuming sulphuric acid in the sulphur solution.

Since the solutions containing sulphur obtained by any of the aforesaid modifications of the process in accordance with the present invention which have been freed from the organic impurities, may contain small amounts of the added acid agents and also of sulphur dioxide formed during the treatment, and since these acid substances present in the sulphur solutions often cause trouble in the further working up of the solutions, as for example by the distillation, in that the distilling vessels are liable to suffer from corrosion, and also in the repeated us of the solvent which has been recovered from the purified sulphur, it is often advisable to subject the solution of sulphur to an aftertreatment with adsorption agents, as for example active carbon, oxide gels or adsorbent clay, whereby simultaneously any suspended organic impurities which may still be present, are removed. The adsorption agents, as for example active carbon, clay, the product known in the trade as Tonsil (which is a bleaching earth activated by means of an acid), silica gel or alumina gel, are removed from the solutions by decantation or filtration, and the solution then yields, upon distillation, a sulphur of very high purity.

The aftertreatment of the solution which has been separated from the purifying agents may also be effected in a highly advantageous manner by means of moistened solid calcium hydroxide which should preferably contain water in an amount of about 50 per cent by weight. The solution treated is very rapidly freed from acid. The purification of the sulphur solution may be effected by mixing it with a small excess of moist, but still pulverulent calcium hydroxide, the mass being stirred for a few minutes. The calcium hydroxide is then allowed to settle and is separated from the supernatant clear solution. The treatment may also be carried out by introducing into the solution several times the quantity of calcium hydroxide required and after settling removing the clear purified sulphur solution and adding further batches of solution to be treated to the calcium hydroxide. In this way further batches of solution can be treated until the calcium hydroxide has been used up nearly completely.

Sulphur from any source which is contaminated with organic substances may be purified according to the present invention.

The following examples will further illustrate how this invention may be carried out in practice but the invention is not restricted to these examples.

Example 1

4 litres of a solution of sulphur in carbon disulphide, containing 35 per cent of sulphur and about 2 per cent of tarry impurities, are vigorously stirred at a temperature of about 20° C. by means of a rapidly moving stirrer rotating 950 times per minute. 25 cubic centimetres (=0.6 per cent by volume) of oleum (specific gravity 1.91) are introduced into the hollow cone formed by the vigorous stirring. A slight increase in temperature occurs; at the end of the same (i.e. after about 1 minute) the reaction is finished. After the separation of the oleum containing the impurities and the removal of any suspended substances and after further removing dissolved sulphur dioxide by washing the solution or by treating it with absorbents and after distilling off the carbon disulphide, sulphur of high purity is obtained.

Example 2

A certain quantity of oleum (10 litres) is introduced into a container provided with a stirrer. Between 210 and 250 litres of a solution of sulphur in carbon disulphide containing tarry impurities are added thereto while stirring. The stirring is continued until a constant temperature is obtained. It is preferable to prevent the temperature rising substantially above 25° to 26° C. or falling substantially below 15° C. The solution is separated. Then the addition of from 210 to 250 litres of sulphur-carbon disulphide solution and the treatment already described is repeated a further 4 times. From the following table the initial and final temperatures, the increase in temperature and the time which is necesary for attaining the final temperatures in each operation can be seen.

| No. | Addition of sulphur-carbon disulphide solution Litres | Oleum Litres | Temperature at the beginning of the addition ° centigrade | Stirring period in minutes | Final temperature ° centigrade | Increase in temperature ° centigrade |
|---|---|---|---|---|---|---|
| 1 | 250 | 10 | 20 | 3 | 26 | 6 |
| 2 | 210 |  | 20 | 4 | 26 | 6 |
| 3 | 210 |  | 20 | 5 | 23.5 | 3.5 |
| 4 | 210 |  | 20 | 5 | 22 | 2 |
| 5 | 210 |  | 20 | 7 | 21 | 1 |

From each portion of crude sulphur-carbon disulphide solution a solution practically free from tarry impurities is obtained.

Example 3

50 litres of oleum are introduced into an iron vessel provided with an iron stirrer. Between 200 and 250 litres of a solution of sulphur in carbon disulphide are added while stirring. The two liquids are vigorously mixed by continuing the stirring for some minutes. The two liquids are then caused to separate and the sulphur-carbon disulphide solution is drawn off. A fresh solution of sulphur in carbon disulphide is added to the oleum and the treatment as already described is repeated. The same treatment of fresh portions of solutions of sulphur is repeated 25 times and from each portion pure yellow sulphur is obtained.

Example 4

A solution of 1 kilogram of crude sulphur containing about 3 per cent of tarry impurities in carbon disulphide is purified by treatment with fuming sulphuric acid in the manner hereinbefore described, for example according to Examples 1, 2 or 3.

4800 parts of the resulting sulphur solution which contains small amounts of organic impurities in an emulsified state and about 300 milligrams of sulphur dioxide per litre, are stirred, in portions of 200 parts each, with 2 parts of the product known in the trade as Tonsil which is a bleaching earth activated by means of an acid. In this way the whole of the 4800 parts of the solution are freed practically completely from organic impurities and sulphur dioxide by means of the same small amount of adsorbent. Since in the subsequent distillation of the carbon disulphide no water is present, any small traces of sulphur dioxide which may still be present, do not cause any corrosion. The sulphur obtained is odorless, of yellow color and of a high degree of purity.

Active carbon may be used with excellent results in a similar manner instead of Tonsil.

Example 5

A saturated solution of sulphur in carbon disulphide which has been obtained by treating a crude sulphur containing tarry impurities in carbon disulphide with oleum in the manner already described (see Examples 2 and 3) and which contains 2 grams of sulphur dioxide and 0.5 gram of sulphur trioxide in each litre is vigorously stirred. 4 per cent by weight of powdered slaked lime containing 30 per cent of water are added. The mixing by stirring is continued for 6 minutes. The solid parts are then allowed to settle. After 5 minutes the clear solution of sulphur in carbon disulphide which is now free from oxides of sulphur is removed.

A fresh portion of the solution of sulphur in carbon disulphide still containing acid constituents is filled into the reaction vessel. The lime still contained in the vessel is vigorously stirred with the solution which is treated as already described. The same operation is repeated 8 times with fresh acid solution.

The sulphur remaining after distilling off the carbon disulphide from the purified solutions is odorless, bright yellow and very pure.

The lime sludge remaining in the vessel after removing the deacidified solutions is washed with pure carbon disulphide by stirring and decanting three times. The carbon disulphide finally remaining in the sludge is removed by introducing hot water.

What we claim is:—

1. The process of purifying sulphur contaminated with organic substances which comprises thoroughly intermixing a solution of said sulphur with fuming sulphuric acid, while taking care that no substantial increase of the temperature takes place.

2. The process of purifying sulphur contaminated with organic substances which comprises thoroughly intermixing a solution of said sulphur with fuming sulphuric acid, while taking care that no substantial increase of the temperature to above about 30° C. takes place.

3. The process of purifying sulphur contaminated with organic substances which comprises thoroughly intermixing a solution of said sulphur with fuming sulphuric acid, the latter being employed in an amount not exceeding 1.5 per cent by volume.

4. The process of purifying sulphur contaminated with organic substances which comprises thoroughly intermixing a solution of said sulphur with fuming sulphuric acid, the latter being employed in an amount not exceeding 1 per cent by volume.

5. The process of purifying sulphur contaminated with organic substances which comprises thoroughly intermixing a solution of said sulphur with fuming sulphuric acid, in substantial excess over the amount required for purification, withdrawing the treated solution, and employing the fuming sulphuric acid for treating a further amount of crude sulphur solution in the same manner.

6. The process of purifying sulphur contaminated with organic substances which comprises thoroughly intermixing a solution of said sulphur with fuming sulphuric acid, at least 5 times in excess over the amount required for purification, withdrawing the treated solution, and employing the fuming sulphuric acid for treating at least 4 further batches of a crude sulphur solution in the same manner.

7. The process of purifying sulphur contaminated with organic substances which comprises thoroughly intermixing a solution of said sulphur with fuming sulphuric acid, the latter being employed in an amount not exceeding 1 per cent by volume, separating the treated solution from the fuming sulphuric acid and acting on the solution with an adsorbent.

8. The process of purifying sulphur contaminated with organic substances which comprises thoroughly intermixing a solution of said sulphur with fuming sulphuric acid, at least 5 times in excess over the amount required for purification, withdrawing the treated solution, and employing the fuming sulphuric acid for treating at least 4 further batches of crude sulphur solution in the same manner, the treated solution being then acted upon with an adsorbent.

FRITZ WINKLER.
FRITZ GILLER.
HANS DORSCH.